(12) United States Patent
Sambhwani et al.

(10) Patent No.: US 8,867,455 B2
(45) Date of Patent: Oct. 21, 2014

(54) ENHANCED UPLINK FOR INACTIVE STATE IN A WIRELESS COMMUNICATION SYSTEM

(75) Inventors: Sharad Deepak Sambhwani, San Diego, CA (US); Bibhu Mohanty, San Diego, CA (US); Francesco Grilli, La Jolla, CA (US); Juan Montojo, San Diego, CA (US); Mehmet Yavuz, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 12/241,457

(22) Filed: Sep. 30, 2008

(65) Prior Publication Data

US 2009/0135769 A1    May 28, 2009

Related U.S. Application Data

(60) Provisional application No. 60/976,758, filed on Oct. 1, 2007, provisional application No. 60/985,412, filed on Nov. 5, 2007, provisional application No. 60/992,427, filed on Dec. 5, 2007.

(51) Int. Cl.

| | | |
|---|---|---|
| *H04W 4/00* | (2009.01) | |
| *H04W 74/08* | (2009.01) | |
| *H04L 5/00* | (2006.01) | |
| *H04W 8/26* | (2009.01) | |
| *H04L 25/03* | (2006.01) | |
| *H04W 8/24* | (2009.01) | |
| *H04W 72/04* | (2009.01) | |
| *H04W 28/16* | (2009.01) | |
| *H04W 72/12* | (2009.01) | |
| *H04W 28/04* | (2009.01) | |

(52) U.S. Cl.
CPC ............ *H04W 74/0825* (2013.01); *H04W 8/26* (2013.01); *H04L 25/03866* (2013.01); *H04W 8/24* (2013.01); *H04W 72/042* (2013.01); *H04L 5/0091* (2013.01); *H04L 5/0053* (2013.01); *H04W 28/16* (2013.01); *H04L 5/0064* (2013.01); *H04W 72/12* (2013.01); *H04W 28/04* (2013.01); *H04L 5/0007* (2013.01)
USPC .......................................... 370/329; 370/400

(58) Field of Classification Search
None
See application file for complete search history.

(56) References Cited

U.S. PATENT DOCUMENTS

| | | |
|---|---|---|
| 6,574,267 B1 | 6/2003 | Kanterakis et al. |
| 6,850,504 B1 | 2/2005 | Cao et al. |

(Continued)

FOREIGN PATENT DOCUMENTS

| | | |
|---|---|---|
| CN | 1723638 A | 1/2006 |
| CN | 1788515 | 6/2006 |

(Continued)

OTHER PUBLICATIONS

International Search Report and Written Opinion—PCT/US2008/078385, International Search Authority—European Patent Office, Sep. 17, 2009.

(Continued)

*Primary Examiner* — David Oveissi
(74) *Attorney, Agent, or Firm* — Darren M. Simon

(57) ABSTRACT

Techniques for supporting operation with enhanced uplink in inactive state are described. A user equipment (UE) may send an access preamble for random access while in an inactive state and may receive a message containing resources allocated to the UE. The allocated resources may be selected by a Node B from a pool of resources pre-allocated to the Node B for the enhanced uplink. The UE may send information (e.g., scheduling information and/or its UE identity) to the Node B using the allocated resources. The UE may receive an acknowledgement addressed to the UE based on the UE identity. The UE may remain in the inactive state and continue to use the allocated resources until they are de-allocated. Alternatively, the UE may transition to an active state and either continue to use the allocated resources or receive an allocation of new resources for the active state.

30 Claims, 10 Drawing Sheets

(56) References Cited

U.S. PATENT DOCUMENTS

| | | | |
|---|---|---|---|
| 2002/0168984 A1* | 11/2002 | Wallentin | 455/452 |
| 2003/0189915 A1* | 10/2003 | Miller | 370/343 |
| 2005/0281222 A1* | 12/2005 | Ranta-Aho et al. | 370/328 |
| 2007/0081449 A1* | 4/2007 | Khan | 370/208 |
| 2008/0051098 A1* | 2/2008 | Rao | 455/452.1 |
| 2008/0123585 A1 | 5/2008 | Granzow et al. | |
| 2008/0268849 A1* | 10/2008 | Narasimha et al. | 455/437 |
| 2008/0273610 A1 | 11/2008 | Malladi et al. | |
| 2009/0041240 A1* | 2/2009 | Parkvall et al. | 380/247 |

FOREIGN PATENT DOCUMENTS

| | | |
|---|---|---|
| CN | 101001448 A | 7/2007 |
| EP | 1505847 A1 | 2/2005 |
| EP | 1610573 A1 | 12/2005 |
| JP | 2008503913 A | 2/2008 |
| JP | 2009514279 A | 4/2009 |
| JP | 2009522893 A | 6/2009 |
| KR | 1020040099474 | 11/2004 |
| RU | 2277762 | 6/2006 |
| RU | 2286649 C2 | 10/2006 |
| WO | WO0232179 A1 | 4/2002 |
| WO | WO02062025 | 8/2002 |
| WO | 2004100598 A1 | 11/2004 |
| WO | WO2005101882 A1 | 10/2005 |
| WO | 2006000876 A1 | 1/2006 |
| WO | WO2006000876 | 1/2006 |
| WO | WO2007048470 A1 | 5/2007 |
| WO | WO2007077250 A2 | 7/2007 |
| WO | WO2007088854 | 8/2007 |

OTHER PUBLICATIONS

Dorot, V., et al., "An Explanatory Dictionary of Modern Computer Terms," 2nd Edition, BHV-Petersburg Publishers, Saint Petersburg, 2001, 'Program Product' on p. 339.

Nokia Corporation, "Contention Resolution with MAC-e", 3GPP TSG-RANWG2Meeting #60; R2-074624, Jeju, Korea, Nov. 5-9, 2007.

Taiwan Search Report—TW097137811—TIPO—May 22, 2012.

LTE standard, TS 36.300, Version 8.1.0, Published in Jul. 2007, Section 10.1.5.1, 3 pages.

* cited by examiner

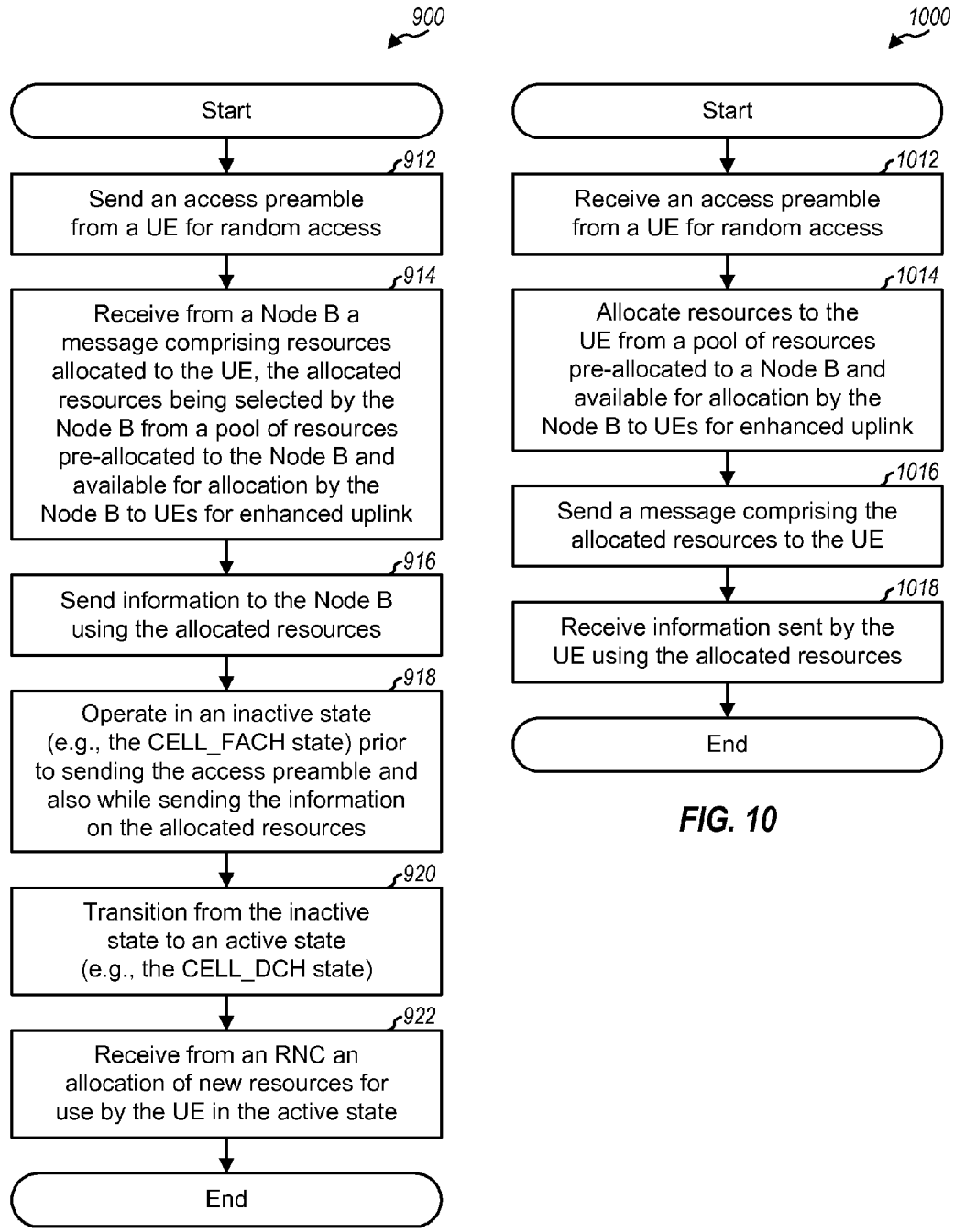

ENHANCED UPLINK FOR INACTIVE STATE IN A WIRELESS COMMUNICATION SYSTEM

I. CLAIM OF PRIORITY UNDER 35 U.S.C. §119

The present Application for Patent claims priority to Provisional U.S. Application Ser. No. 60/976,758, filed Oct. 1, 2007, Provisional U.S. Application Ser. No. 60/985,412, filed Nov. 5, 2007, and Provisional U.S. Application Ser. No. 60/992,427, filed Dec. 5, 2007, all entitled "ENHANCED UPLINK USING RACH IN WIRELESS COMMUNICATIONS," assigned to the assignee hereof, and expressly incorporated herein by reference.

BACKGROUND

I. Field

The present disclosure relates generally to communication, and more specifically to techniques for sending data in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

A UE may be intermittently active and may operate in (i) an active state to actively exchange data with a Node B or (ii) an inactive state when there is no data to send or receive. One or more slow common channels, such as a random access channel (RACH), may be available to the UE in the inactive state. The UE may be assigned resources for a high-speed channel when it transitions to the active state. However, the state transition may incur signaling overhead and may also delay data transmission. It is desirable to reduce the amount of signaling in order to improve system efficiency and reduce delay.

SUMMARY

Techniques for supporting efficient UE operation with enhanced uplink for inactive state are described herein. Enhanced uplink refers to use of a high-speed channel having greater transmission capability than a slow common channel on the uplink.

In an aspect, a UE may be allocated resources for a high-speed channel for enhanced uplink while in an inactive state and may more efficiently send information using the allocated resources in the inactive state. In one design, the UE may send an access preamble for random access and may receive a message comprising resources allocated to the UE. The allocated resources may be selected by a Node B from a pool of resources, which may be pre-allocated to the Node B and available for allocation by the Node B to UEs for enhanced uplink. The UE may send information (e.g., scheduling information, a UE identity, and short messages, etc.) to the Node B using the allocated resources. The UE may remain in the inactive state and may continue to use the allocated resources until they are de-allocated. Alternatively, the UE may transition from the inactive state to an active state, e.g., for a voice call or a data call. The UE may continue to use the allocated resources after the transition or may receive an allocation of new resources for use in the active state.

In another aspect, the UE may perform random access with collision detection and resolution for the enhanced uplink. The UE may select a signature from a first set of signatures available for random access with the enhanced uplink. The first set of signatures may be different from a second set of signatures available for random access with a random access channel. The UE may generate an access preamble based on the selected signature, send the access preamble for random access, and receive an acquisition indicator from the Node B. The UE may then send a UE identity to the Node B for collision detection. The UE may receive from the Node B an acknowledgement addressed to the UE based on the UE identity. The UE may set a timer upon sending the UE identity to the Node B and may send another access preamble if an acknowledgement is not received prior to expiration of the timer.

Various aspects and features of the disclosure are described in further detail below.

BRIEF DESCRIPTION OF THE DRAWINGS

FIG. 9 shows a process performed by a UE for the enhanced uplink.

FIG. 10 shows a process performed by a Node B for the enhanced uplink.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for WCDMA, and 3GPP terminology is used in much of the description below.

Figure 1:
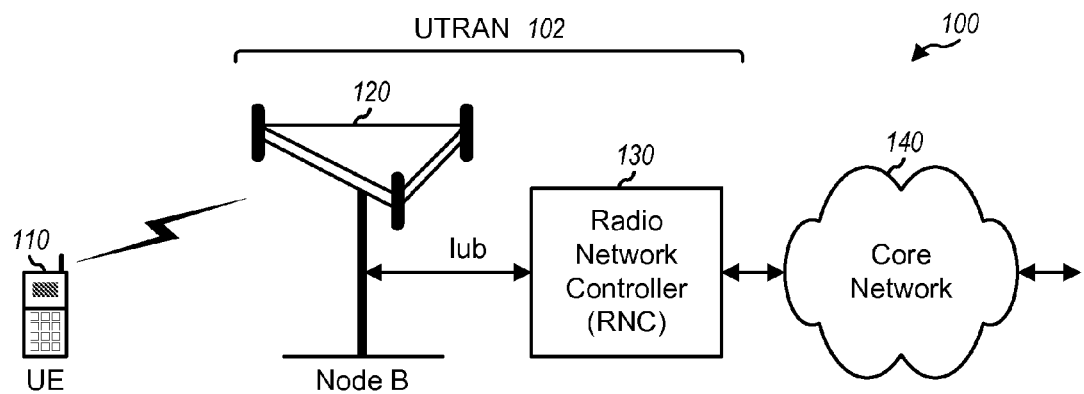
FIG. 1 shows a wireless communication system.

FIG. 1 shows a wireless communication system 100, which includes a Universal Terrestrial Radio Access Network (UTRAN) 102 and a core network 140. UTRAN 102 may include a number of Node Bs and other network entities. For simplicity, only one Node B 120 and one Radio Network Controller (RNC) 130 are shown in FIG. 1 for UTRAN 102. A Node B may be a fixed station that communicates with the UEs and may also be referred to as an evolved Node B (eNB), a base station, an access point, etc. Node B 120 provides communication coverage for a particular geographic area. The coverage area of Node B 120 may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

RNC 130 may couple to Node B 120 and other Node Bs via an Iub interface and may provide coordination and control for these Node Bs. RNC 130 may also communicate with network entities within core network 140. Core network 140 may include various network entities (e.g., a Mobile Switching Center (MSC)) that support various functions and services for the UEs.

A UE 110 may communicate with Node B 120 via the downlink and uplink. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable highspeed packet data transmission on the downlink and uplink, respectively.

Figure 2:
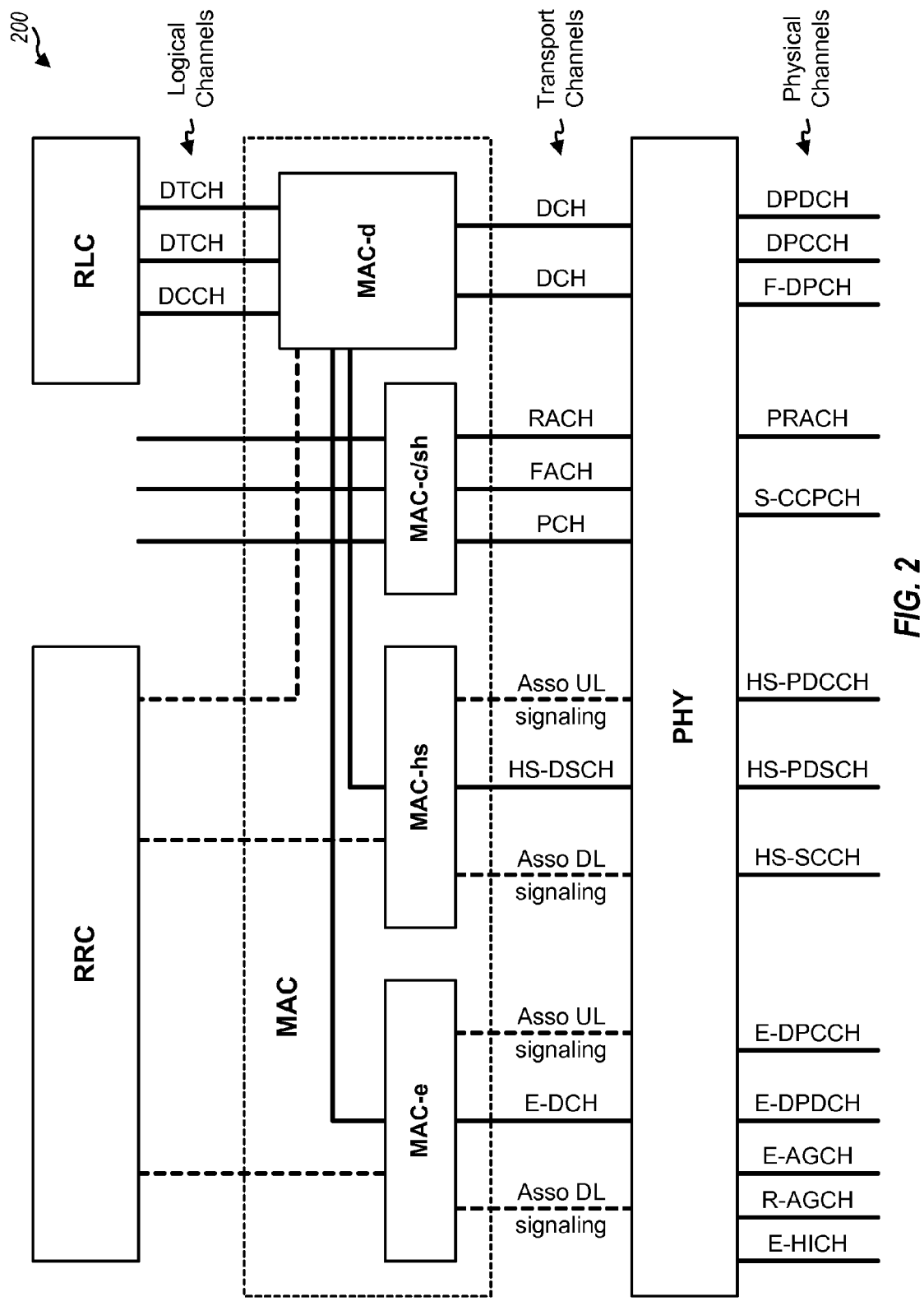
FIG. 2 shows a layer structure with various protocols and channels.

FIG. 2 shows a layer structure 200 for WCDMA in 3GPP Release 6 and later. Layer structure 200 includes Radio Resource Control (RRC), Radio Link Control (RLC), Medium Access Control (MAC), and physical layer (PHY). RRC is part of Layer 3, RLC and MAC are part of Layer 2, and PHY is part of Layer 1.

RRC performs various functions for establishment, maintenance, and termination of calls. RLC provides various services to upper layers such as transparent, unacknowledged and acknowledged data transfers, maintenance of quality of service (QoS) as defined by upper layers, and notification of unrecoverable errors. RLC processes and provides data in logical channels, e.g., a Dedicated Traffic Channel (DTCH) and a Dedicated Control Channel (DCCH) for transfer of data and signaling, respectively.

MAC provides various services to upper layers such as data transfer, reallocation of radio resources and MAC parameters, and reporting of measurements. MAC includes various entities such as MAC-d, MAC-hs, MAC-e and MAC-c/sh. MAC-d provides functionality such as transport channel type switching, multiplexing of logical channels to transport channels, ciphering, deciphering, and uplink transport format combination (TFC) selection. MAC-hs supports HSDPA and performs functions such as transmission and retransmission, reordering, and disassembly. MAC-e supports HSUPA and performs functions such as transmission and retransmission, multiplexing, and evolved TFC (E-TFC) selection. MAC-c/sh supports a paging channel, a forward access channel, a random access channel, etc. MAC exchanges data with RLC via transport channels and exchanges data with PHY via physical channels. The various protocols and channels in FIG. 2 are described in 3GPP TS 25.301, entitled "Radio Interface Protocol Architecture," which is publicly available.

Table 1 lists some transport channels in WCDMA.

TABLE 1

Transport Channels

| Channel | Channel Name | Description |
|---|---|---|
| DCH | Dedicated Channel | Carry data on downlink or uplink for a specific UE. |
| HS-DSCH | High Speed Downlink Shared Channel | Carry data sent on downlink to different UEs for HSDPA. |
| E-DCH | Enhanced Dedicated Channel | Carry data sent by different UEs on uplink for HSUPA. |
| RACH | Random Access Channel | Carry preambles and messages sent by UEs on uplink for random access. |
| FACH | Forward Access Channel | Carry messages sent on downlink to UEs for random access. |
| PCH | Paging Channel | Carry paging and notification messages. |

Table 2 lists some physical channels in WCDMA.

TABLE 2

Physical Channels

| Channel | Channel Name | Description |
|---|---|---|
| PRACH | Physical Random Access Channel | Carry the RACH. |
| AICH | Acquisition Indicator Channel | Carry acquisition indicators sent on downlink to UEs. |
| F-DPCH | Fractional Dedicated Physical Channel | Carry Layer 1 control information, e.g., power control commands. |

TABLE 2-continued

Physical Channels

| | Channel | Channel Name | Description |
|---|---|---|---|
| HSDPA | HS-SCCH (Downlink) | Shared Control Channel for HS-DSCH | Carry control information for data sent on the HS-PDSCH. |
| | HS-PDSCH (Downlink) | High Speed Physical Downlink Shared Channel | Carry data sent on the downlink to different UEs. |
| | HS-DPCCH (Uplink) | Dedicated Physical Control Channel for HS-DSCH | Carry ACK/NAK for data received on the HS-PDSCH and channel quality indicator (CQI). |
| HSUPA | E-DPCCH (Uplink) | E-DCH Dedicated Physical Control Channel | Carry control information for the E-DPDCH. |
| | E-DPDCH (Uplink) | E-DCH Dedicated Physical Data Channel | Carry data sent on the uplink by different UEs. |
| | E-HICH (Downlink) | E-DCH Hybrid ARQ Indicator Channel | Carry ACK/NAK for data sent on the E-DPDCH. |
| | E-AGCH (Downlink) | E-DCH Absolute Grant Channel | Carry absolute grants of uplink resources for the E-DPDCH. |
| | E-RGCH (Downlink) | E-DCH Relative Grant Channel | Carry relative grants of uplink resources for the E-DPDCH. |

WCDMA supports other transport channels and physical channels that are not shown in Tables 1 and 2 for simplicity. The transport channels and physical channels in WCDMA are described in 3GPP TS 25.211, entitled "Physical channels and mapping of transport channels onto physical channels (FDD)," which is publicly available.

HSDPA and HSUPA support hybrid automatic retransmission (HARQ). For HARQ, a transmitter may send a transmission for a transport block and may send one or more retransmissions until the transport block is decoded correctly by a receiver, or the maximum number of retransmissions has been sent, or some other termination condition is encountered. All transmission and retransmissions of the transport block may be sent in one HARQ process. One or more HARQ processes may be active and used to send one or more transport blocks to the receiver.

Figure 3:
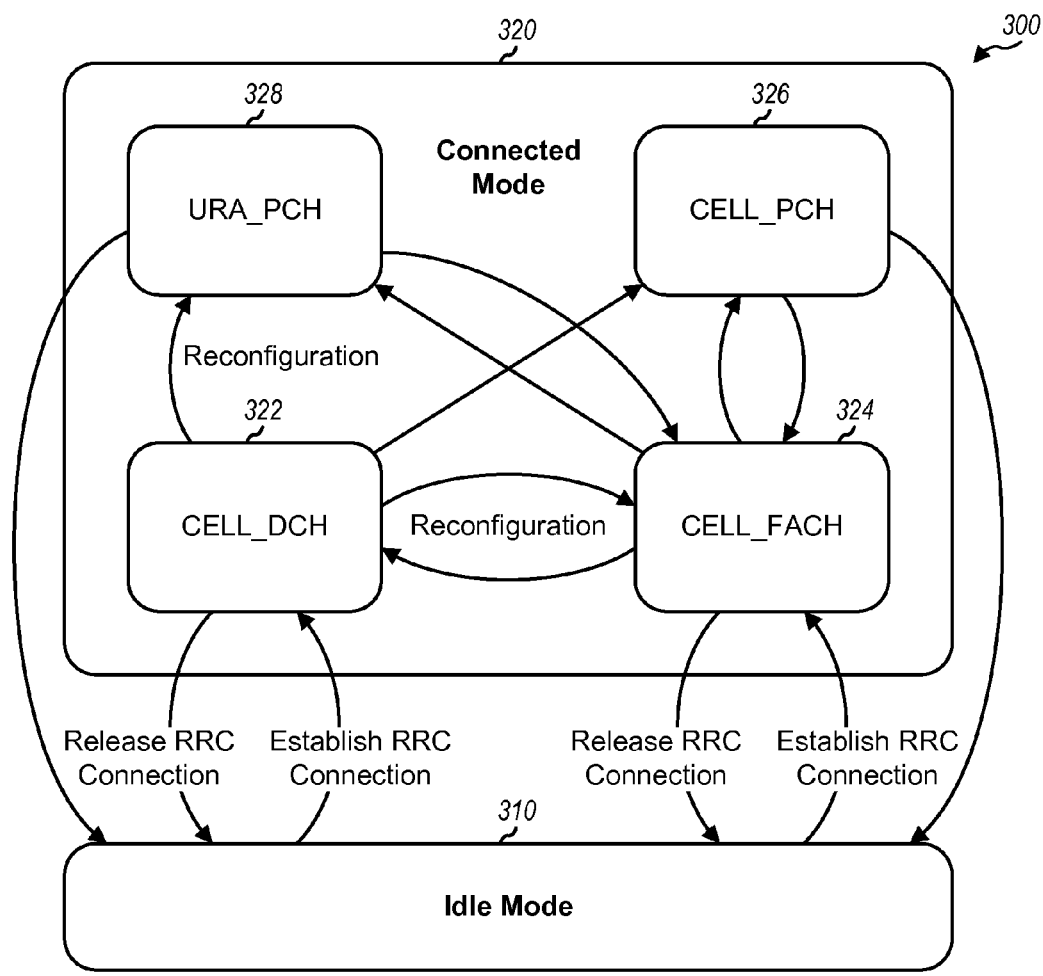
FIG. 3 shows a diagram of various operating states and modes for a UE.

FIG. 3 shows a state diagram 300 of RRC states for a UE in WCDMA. Upon being powered on, the UE may perform cell selection to find a suitable cell from which the UE can receive service. The UE may then transition to an Idle mode 310 or a Connected mode 320 depending on whether there is any activity for the UE. In the Idle mode, the UE has registered with the system, listens for paging messages, and updates its location with the system when necessary. In the Connected mode, the UE can receive and/or transmit data depending on its RRC state and configuration.

In the Connected mode, the UE may be in one of four possible RRC states—a CELL_DCH state 322, a CELL_FACH state 324, a CELL_PCH state 326, or a URA_PCH state 328, where URA stands for User Registration Area. The CELL_DCH state is characterized by (i) dedicated physical channels being allocated to the UE for the downlink and uplink and (ii) a combination of dedicated and shared transport channels being available to the UE. The CELL_FACH state is characterized by (i) no dedicated physical channels being allocated to the UE, (ii) a default common or shared transport channel assigned to the UE for use to access the system, and (iii) the UE continually monitoring the FACH for signaling such as Reconfiguration messages. The CELL_PCH and URA_PCH states are characterized by (i) no dedicated physical channels being allocated to the UE, (ii) the UE periodically monitoring the PCH for pages, and (iii) the UE not being permitted to transmit on the uplink.

While in the Connected mode, the system can command the UE to be in one of the four RRC states based on activity of the UE. The UE may transition (i) from any state in the Connected mode to the Idle mode by performing a Release RRC Connection procedure, (ii) from the Idle mode to the CELL_DCH or CELL_FACH state by performing an Establish RRC Connection procedure, and (iii) between the states in the Connected mode by performing a Reconfiguration procedure.

The modes and states for the UE in WCDMA are described in 3GPP TS 25.331, entitled "Radio Resource Control (RRC); Protocol Specification," which is publicly available. The various procedures for transitioning to/from the RRC states as well as between the RRC states are also described in 3GPP TS 25.331.

The UE may operate in the CELL_FACH state when there is no data to send or receive. The UE may transition from the CELL_FACH state to the CELL_DCH state whenever there is data to send or receive and may transition back to the CELL_FACH state after sending or receiving the data. The UE may perform a random access procedure and an RRC Reconfiguration procedure in order to transition from the CELL_FACH state to the CELL_DCH state. The random access procedure may also be referred to as a PRACH procedure. The UE may exchange signaling messages for these procedures. For WCDMA, resources are normally allocated by an RNC via message exchanges that can result in both signaling overhead and setup delay.

In an aspect, an enhanced uplink (EUL) is provided to improve UE operation in an inactive state. In general, an inactive state may be any state or mode in which a UE is not allocated dedicated resources for communication with a Node B. For RRC, an inactive state may be the CELL_FACH state, the CELL_PCH state, the URA_PCH state, or the Idle mode. An inactive state may be in contrast to an active state, such as the CELL_DCH state, in which a UE is allocated dedicated resources for communication.

The enhanced uplink for inactive state may also be referred to as an Enhanced Random Access Channel (E-RACH), enhanced uplink in CELL_FACH state and Idle mode, an enhanced uplink procedure, etc. For WCDMA, the enhanced uplink may have the following characteristics:

Reduce latency of user plane and control plane in the Idle mode and the CELL_FACH, CELL_PCH and URA_PCH states, Support higher peak rates for UEs in the CELL_FACH, CELL_PCH and URA_PCH states by use of HSUPA, and Reduce state transition delay from the CELL_FACH, CELL_PCH and URA_PCH states to the CELL_DCH state.

The enhanced uplink may be supported with a MAC entity in a Node B that can more quickly grant pre-allocated uplink resources to a UE. The enhanced uplink may allow the UE to efficiently send a small amount of data in the CELL_FACH state, which may avoid the need to transition to the CELL_DCH state. The enhanced uplink may also allow the UE to quickly transition from the CELL_FACH state to the CELL_DCH state. The enhanced uplink may also be used in other scenarios to improve performance and system efficiency.

Figure 4:
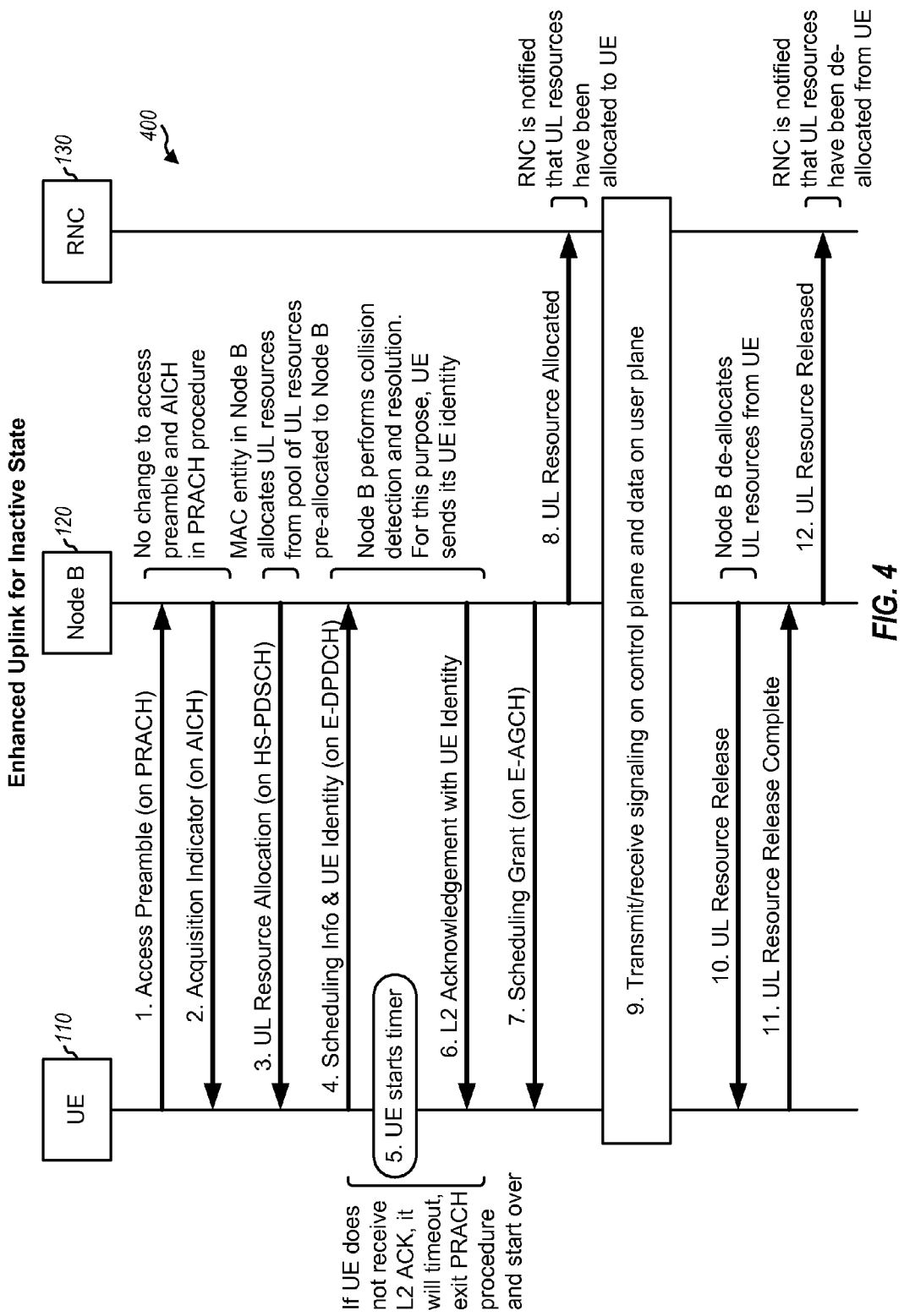
FIG. 4 shows a call flow for operation with an enhanced uplink.

FIG. 4 shows a design of a call flow 400 for operation with the enhanced uplink. UE 110 may operate in the CELL_FACH state and may desire to send a small amount of data or to transition to the CELL_DCH state. UE 110 may perform a random access procedure and may randomly select a signature from a set of available signatures. The signature may be used as a temporary UE identity for the random access procedure. UE 110 may generate an access preamble (which may also be referred to as a RACH preamble) based on the signature and may send the access preamble on the uplink (step 1). Node B 120 may receive the access preamble from UE 110 and may return an acquisition indicator on the AICH to UE 110 (step 2). The acquisition indicator may indicate a positive acknowledgement for the signature sent in the access preamble by UE 110.

In response to receiving the access preamble, Node B 120 may begin the process of allocating uplink resources to allow UE 110 to transmit messages on the uplink. For WCDMA, RNC 130 typically allocates resources to a UE in response to a request from a Node B. In one design, RNC 130 may pre-allocate a pool of resources to Node B 120 for allocation by Node B 120 to UEs for the enhanced uplink. This pool of pre-allocated resources may be referred to as common E-DCH resources. RNC 130 may also set up DCCH radio bearers on the Iub interface (which may be referred to as Iub bearers) corresponding to the pre-allocated resources ahead of time in order to reduce call setup delays. Node B 120 may allocate resources to UE 110 from the pool of pre-allocated resources and may send an uplink (UL) resource allocation message to UE 110 (step 3). The uplink resource allocation message may be a MAC control message, may convey various types of information as described below, and may be sent on the HS-PDSCH.

UE 110 may receive the uplink resource allocation message from Node B 120 and may send its UE identity, scheduling information (SI), and/or data in one or more messages to Node B 120 using the allocated uplink resources (step 4). In one design, the allocated uplink resources may be for HSUPA, and UE 110 may send information using the E-DPDCH in step 4. The UE identity may be an E-DCH Radio Network Temporary Identifier (E-RNTI) assigned to UE 110 by RNC 130 and retained by UE 110 during the CELL_FACH state. The UE identity may also be an International Mobile Subscriber Identity (IMSI), a Temporary Mobile Subscriber Identity (TMSI), or some other type of UE identity. For example, UE 110 may not have an E-RNTI in the Idle mode and may send all or part of its IMSI or TMSI as the UE identity. In any case, the UE identity may be used by Node B 120 for collision detection and resolution, as described below. The scheduling information may convey the buffer size at UE 110 and/or other information and may be used by Node B 120 to grant uplink resources to UE 110. UE 110 may start a timer upon sending the information in step 4 (step 5).

Node B 120 may receive one or more access preambles from one or more UEs in step 1, and each UE may send its UE identity in step 4. A collision may occur when multiple UEs transmit their access preambles at the same time using the same signature. Node B 120 may perform collision detection and resolution. If Node B 120 receives a UE identity from only one UE and detects no collision, then Node B 120 may return a Layer 2 (L2) acknowledgement message for this UE identity, e.g., by sending the UE identity as part of the L2 acknowledgement message (step 6). If Node B 120 detects a collision, then Node B 120 may decide to send an L2 acknowledgement message to only one of the UEs. For both cases, a UE that receives an L2 acknowledgement message with its UE identity would know that its access preamble has been successfully detected and acknowledged by the Node B. In FIG. 4, Node B 120 sends the L2 acknowledgement message to UE 110. Node B 120 may also send a scheduling grant to UE 110, e.g., on the E-AGCH (step 7). Node B 120 may also notify RNC 130 that uplink resources have been allocated to UE 110 along with the UE identity (step 8).

After starting the timer in step 5, UE 110 may wait for an L2 acknowledgement message from Node B 120. If the timer expires and an L2 acknowledgement message is not received from Node B 120 (not shown in FIG. 4), then UE 110 may exit the random access procedure and may start over beginning with step 1, e.g., in accordance with a backoff mechanism. If UE 110 receives the L2 acknowledgement message (in step 6), then UE 110 may determine whether the UE identity from this message matches its UE identity. If the UE identity matches, then UE 110 may wait for a scheduling grant from Node B 120. Upon receiving the scheduling grant from Node B 120 (in step 7), UE 110 can exchange (e.g., send and receive) signaling messages via a control plane with RNC 130 and can also exchange data via a user plane, e.g., on the HS-PDSCH and E-DPDCH (step 9). The control plane carries signaling messages for RRC and upper layers whereas the user plane carries traffic data.

For enhanced uplink operation, UE 110 and Node B 120 may operate as if UE 110 is in the CELL_DCH state even though UE 110 may actually be in the CELL_FACH state. In particular, Node B 120 may send absolute grants on the E-AGCH, relative grants on the E-RGCH, and acknowledgement (ACK) and negative acknowledgement (NACK) feedback on the E-HICH, as normally done for HSUPA in the CELL_DCH state. UE 110 may send CQI and ACK/NACK information on the HS-DPCCH to Node B 120. In one design, UE 110 is not in soft handover for the enhanced uplink and does not obey power control commands or rate control commands (sent via the E-RGCH) from non-serving Node Bs. In this design, UE 110 may temporarily impact capacity of the neighbor Node Bs while using the enhanced uplink. In another design, the non-serving Node Bs may send power control commands and rate control commands to UE 110 for the enhanced uplink.

Node B 120 may detect that UE 110 no longer needs the enhanced uplink, e.g., via the scheduling information sent by UE 110 or detection of inactivity on the uplink by Node B 120. Node B 120 may then decide to de-allocate the resources allocated to UE 110 and may send an uplink resource release message (which may be a MAC control message) to UE 110 (step 10). UE 110 may release the uplink resources and may return an uplink resource release complete message to Node B 120 (step 11). Node B 120 may notify RNC 130 that resources for UE 110 have been released (step 12).

Conversely, Node B 120 may detect that UE 110 is actively transmitting data on the uplink, e.g., beyond a certain time, which may be kept track by a timer. UE 110 may also perform random access with intent to transition to the CELL_DCH state (e.g., for a voice call or a data call) and may convey this intent. In any case, Node B 120 may notify RNC 130 regarding these events. RNC 130 may then instruct UE 110 to transition to the CELL_DCH state. In one design, UE 110 may continue to use the resources already allocated to UE 110 after transitioning to the CELL_DCH state. For this design, RNC 130 may regain control of the resources allocated to UE 110 and may provide Node B 120 with additional uplink resources for the pool of pre-allocated resources for future enhanced uplink operation. In another design, UE 110 may release the resources allocated to the UE, and the released resources may be placed back in the pool of pre-allocated resources. UE 110 may be allocated new resources for the transition to the CELL_DCH state, e.g., via a Radio Bearer Setup message sent by RNC 130 to UE 110. For both designs, the transition to the CELL_DCH state should ensure minimal or no interruption on Layer 1, since the radio bearers have already been set up. This may reduce call setup delays as well as latency of the user and control planes.

For clarity, most of the description for FIG. 4 assumes that UE 110 initially operates in the CELL_FACH state. The enhanced uplink operation in FIG. 4 may also be used if UE 110 operates in the CELL_PCH state, the URA_PCH state, or the Idle mode.

For the conventional random access procedure without the enhanced uplink, a UE may send an access preamble in step 1 and may receive an acquisition indicator in step 2. The UE may then send a RACH message on the slow PRACH, which has a rate of 8 kilobits/second (kbps) and does not support HARQ. The slow PRACH has some negative impacts on system operation. First, due to the slow speed and lack of H-ARQ on the PRACH, a UE typically does not send short messages in the CELL_FACH state. Instead, the UE typically transitions to the CELL_DCH state in order to send short messages. This introduces latency in sending the short messages due to the call setup procedure to transition to the CELL_DCH state. Furthermore, the UE typically transitions back to the CELL_FACH state after sending the short messages, which may be keep-alive messages for VoIP or other messages for other applications. Resources are consumed to send signaling messages to transition back and forth between the CELL_FACH and CELL_DCH states.

The enhanced uplink operation in FIG. 4 utilizes steps 1 and 2 of the random access procedure. However, instead of using the slow PRACH, a UE may be allocated uplink resources for a high-speed channel (e.g., the E-DPDCH) and may more efficiently send a RACH message and/or other information on the enhanced uplink. The high-speed channel may improve call setup delays (e.g., for VoIP and other applications). The UE may also send short messages (e.g., SIP related messages for VoIP) on the enhanced uplink in the CELL_FACH state and may experience less delay for data transmission as well as avoid a transition to the CELL_DCH state. The UE may also send larger RRC messages such as measurement reports (e.g., to enable faster handoff) on the enhanced uplink.

In the design shown in FIG. 4, the enhanced uplink operation utilizes an access preamble in the same manner as a conventional random access procedure. For WCDMA, a 4096-chip access preamble may be generated by repeating a 16-chip signature 256 times. A mechanism may be defined and used to distinguish between legacy UEs performing the conventional random access procedure and new UEs using the enhanced uplink. In one design, the available signatures may be divided into two sets—a first set of signatures available for legacy UEs and a second set of signatures available for new UEs. For example, 16 signatures available in WCDMA may be divided into two sets, with each set including 8 signatures. The signatures in each set may be broadcast to the UEs or may be known a priori by the UEs. The legacy UEs may use the signatures in the first set for the random access procedure, and the new UEs may use the signatures in the second set for the enhanced uplink. In another design, the legacy UEs and the new UEs use different access preamble codes. One access preamble code may be used by legacy UEs for the random access procedure, and another access preamble code may be used by new UEs for the enhanced uplink. For all designs, a Node B can distinguish between access preambles from legacy UEs and access preambles from new UEs. The Node B may perform the random access procedure for each legacy UE and may operate with the enhanced uplink for each new UE.

In the design shown in FIG. 4, Node B 120 may send an uplink resource allocation message in step 3 to allow UE 110 to transmit using the high-speed E-DPDCH instead of the slow PRACH in step 4. The uplink resource allocation message may include various types of information. In one design, the uplink resource allocation message may include all or a subset of the following:

- E-RNTI—may be assigned by the Node B and used by the UE in case the UE does not already have one assigned,
- Uplink DPCH information—information used for uplink transmission on the DPCH, e.g., scrambling code type, scrambling code number, etc.
- E-DCH information—information used for E-DCH operation, e.g., information for the E-DPDCH, E-DPCCH, E-AGCH, E-RGCH, E-HICH, etc.,
- F-DPCH information—information used to receive control transmission sent on the F-DPCH,
- Maximum uplink transmit power of the UE,
- Transmission time interval (TTI) to use, e.g., 2 ms or 10 ms, and
- Default serving grant (e.g., traffic-to-pilot ratio), which may correspond to an initial grant available to the UE when it begins E-DCH transmission.

The uplink resource allocation message may also include different and/or additional information.

HSUPA employs closed-loop power control and H-ARQ for the E-DCH and further supports TTI of 2 ms and 10 ms. The 2 ms TTI may reduce latency and support higher peak rates. In one design, Node B 120 may decide which TTI to use for the enhanced uplink and may send the selected TTI to UE 110 in the uplink resource allocation message. For this design, new UEs may support both 2 ms and 10 ms TTIs. In another design, either 2 ms or 10 ms may be used for the enhanced uplink and may be known a priori by the new UEs or broadcast by Node B 120.

UE 110 may be allocated sufficient resources to send a small amount of data to Node B 120. This small amount of data may be for one or more short messages such as an HTTP request message of 500 bytes or less. The small amount of data may be sent in one or more transport blocks of a suitable transport block size (TBS) on one or more HARQ processes. Assuming a delay budget of 80 ms, 500 bytes of data may be sent with one of the following configurations:

- 2 ms TTI, eight H-ARQ processes, four target HARQ transmissions
  - TBS=500 bits sent in each of eight H-ARQ processes,
  - TBS=1000 bits sent in each of four H-ARQ processes,
  - TBS=2000 bits sent in each of two H-ARQ processes, or
  - TBS=4000 bits sent in one H-ARQ process.
- 10 ms TTI, four H-ARQ processes, four target HARQ transmissions TBS=1000 bits sent in each of four H-ARQ processes,
TBS=2000 bits sent in each of two H-ARQ processes, or
TBS=4000 bits sent in one H-ARQ process.

The configurations described above may be supported by a cell-edge or coverage limited UE with a target data rate of 64 kilobits/second (kbps) with 2 ms TTI or 50 kbps with 10 ms TTI.

A large set of TBSs (e.g., 128 TBSs) may be supported for the E-DCH in the CELL_DCH state. In one design, the entire large set of TBSs may be used for the E-DCH for the enhanced uplink. This design may allow UE 110 and Node B 120 to operate in the same manner for E-DCH regardless of whether UE 110 is in the CELL_DCH state or operating with the enhanced uplink. In another design, a small set of TBSs may be supported for the E-DCH for the enhanced uplink. Only a small number of TBSs are typically used for the PRACH. The small set of TBSs for the E-DCH may include the TBSs for the PRACH and some additional TBSs for higher data rates. For example, the small set of TBSs for the E-DCH may include TBSs of 168 bits and 360 bits commonly used for the PRACH as well as additional TBSs of 500 bits and 1000 bits for 2 ms TTI to support transmission of more data by UEs. The small set of TBSs for the E-DCH may reduce signaling overhead on the E-DPCCH, which may improve uplink performance. The small set of TBSs may also reduce E-DPCCH processing complexity at the Node B.

The enhanced uplink described herein may be used in various call flows for various operating scenarios. The enhanced uplink may be used to reduce setup delays and obtain other benefits. The use of the enhanced uplink in several common call flows is described below.

Figure 5:
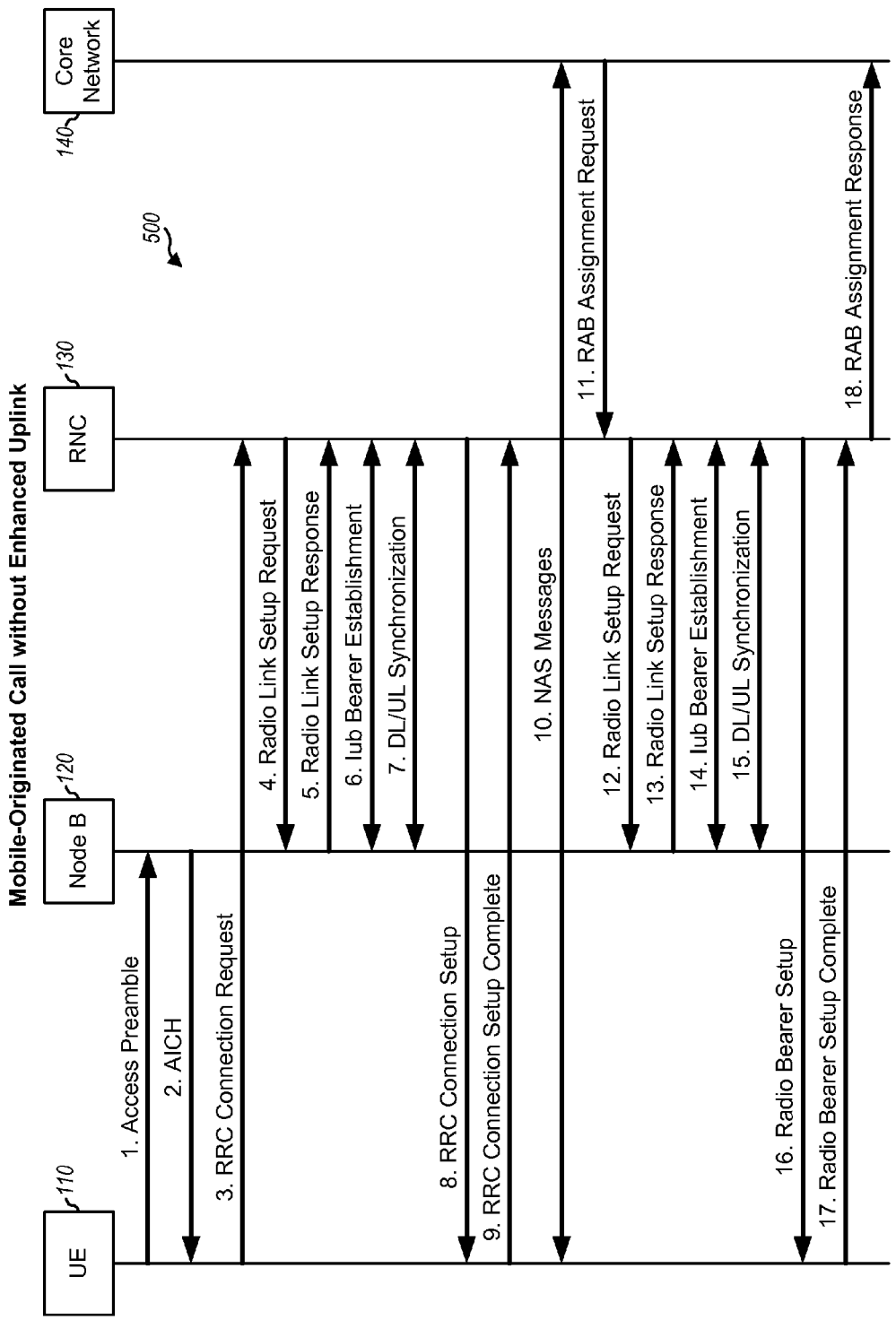
FIG. 5 shows a call flow for a mobile-originated call using a RACH.

FIG. 5 shows a call flow 500 for a mobile-originated call using conventional RACH. UE 110 may operate in the CELL_FACH state and may desire to initiate a call. UE 110 may send an access preamble on the uplink (step 1) and may receive an acquisition indicator on the AICH from Node B 120 (step 2). UE 110 may then send an RRC Connection Request message to RNC 130 using the slow PRACH (step 3). RNC 130 may set up an RRC connection for UE 110 and may send a Radio Link Setup Request message to Node B 120 (step 4). Node B 120 may set up a radio link for UE 110 and may return a Radio Link Setup Response message to RNC 130 (step 5). RNC 130 may exchange signaling messages with Node B 120 to establish an Iub bearer for UE 110 (step 6) and to synchronize the Iub bearer for the downlink and uplink (step 7). RNC 130 may then send an RRC Connection Setup message containing dedicated resources to UE 110 (step 8). UE 110 may transition to the CELL_DCH state upon receiving the RRC Connection Setup message and may return an RRC Connection Setup Complete message to RNC 130 (step 9).

UE 110 may exchange Non-Access Stratum (NAS) messages with core network 140 to set up the call for UE 110 (step 10). Core network 140 may send an RAB Assignment Request message to RNC 130 to establish a radio access bearer (RAB) for the call (step 11). RNC 130 may then exchange signaling messages with Node B 120 for radio link setup and Iub bearer establishment for the RAB (steps 12 to 15). RNC 130 may then send a Radio Bearer Setup message with new dedicated resources for the RAB to UE 110 (step 16). UE 110 may add the new resources and may return a Radio Bearer Setup Complete message to RNC 130 (step 17). RNC 130 may return an RAB Assignment Response message to core network 140 (step 18). UE 110 may thereafter communicate with Node B 120 and RNC 130 for the call.

As shown in FIG. 5, the call setup for the mobile-originated call may include exchanges of various signaling messages between UE 110, Node B 120, RNC 130, and core network 140. These message exchanges may delay service for UE 110. Furthermore, UE 110 may send signaling messages to RNC 130 using the slow PRACH, which may also delay call setup.

Figure 6:
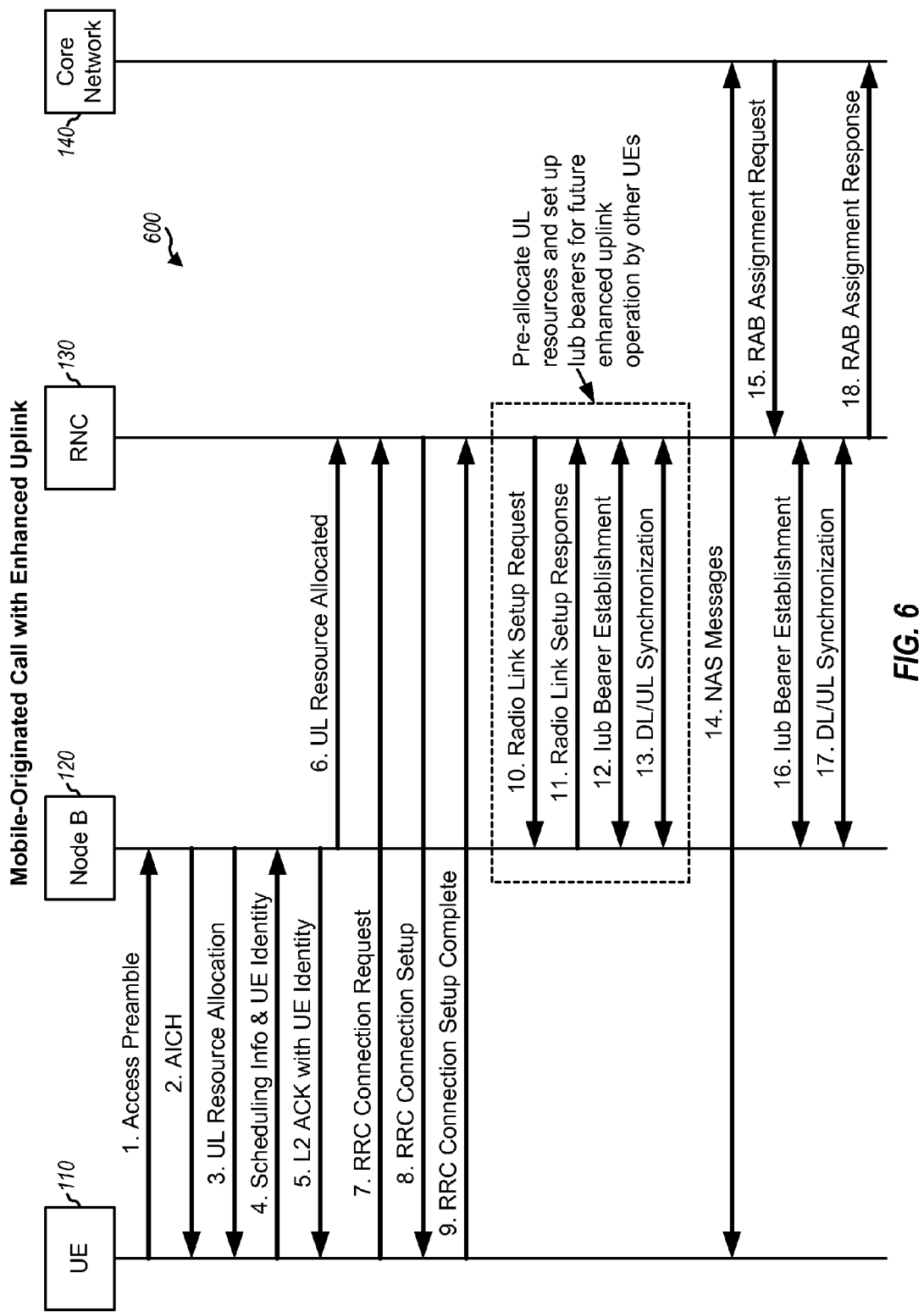
FIG. 6 shows a call flow for a mobile-originated call using the enhanced uplink.

FIG. 6 shows a design of a call flow 600 for a mobile-originated call using the enhanced uplink. UE 110 may operate in the CELL_FACH state and may desire to initiate a call. UE 110 may send an access preamble on the uplink (step 1) and may receive an acquisition indicator on the AICH from Node B 120 (step 2). UE 110 may also receive an uplink resource allocation message from Node B 120 (step 3). UE 110 may send scheduling information and its UE identity using the allocated resources (step 4) and may receive an L2 acknowledgement message from Node B 120 (step 5). Node B 120 may notify RNC 130 that uplink resources have been allocated to UE 110 (step 6).

UE 110 may send an RRC Connection Request message to RNC 130 using the high-speed E-DPDCH (step 7). Since the resources allocated to UE 110 may come from a pool of resources pre-allocated to Node B 120, steps 4 through 7 in FIG. 5 may be skipped in call flow 600 in FIG. 6. RNC 130 may send an RRC Connection Setup message to UE 110 (step 8). UE 110 may transition to the CELL_DCH state and return an RRC Connection Setup Complete message to RNC 130 (step 9). Node B 120 and RNC 130 may exchange signaling messages to pre-allocate uplink resources and set up Iub bearers for future enhanced uplink operation by other UEs (steps 10 to 13). Steps 10 to 13 may be performed at any time and may have minimal or no impact to call setup for UE 110.

After sending the RRC Connection Setup Complete message in step 10, UE 110 may exchange NAS messages with core network 140 (step 14). Core network 140 may send an RAB Assignment Request message to RNC 130 (step 15). RNC 130 may then exchange signaling messages with Node B 120 for Iub bearer establishment and downlink/uplink synchronization (steps 16 and 17). RNC 130 may then return an RAB Assignment Response message to core network 140 (step 18). UE 110 may thereafter communicate with Node B 120 and RNC 130 for the call.

In the design shown in FIG. 6, the call setup for the mobile-originated call may include fewer exchanges of signaling messages between UE 110, Node B 120, RNC 130, and core network 140. The fewer message exchanges may shorten call setup delay and allow UE 110 to obtain service faster. Furthermore, UE 110 may send signaling messages to RNC 130 using the enhanced uplink, which may also reduce call setup delay.

Figure 7:
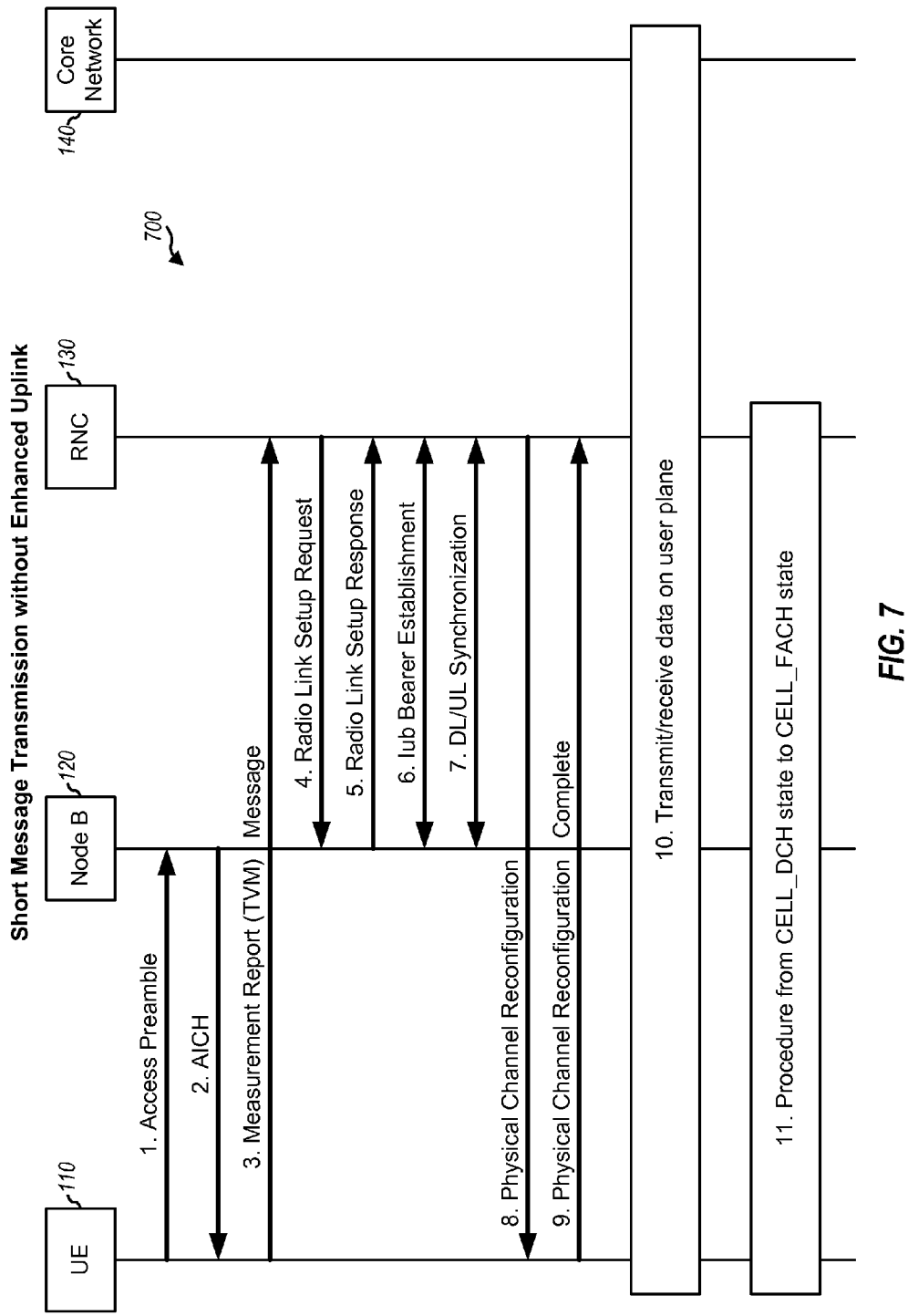
FIG. 7 shows a call flow for short message transmission using the RACH.

FIG. 7 shows a call flow 700 for short message transmission using the RACH in the CELL_FACH state. UE 110 may operate in the CELL_FACH state and may desire to send a short message. UE 110 may send an access preamble on the uplink (step 1) and may receive an acquisition indicator on the AICH from Node B 120 (step 2). UE 110 may then send a Measurement Report message containing a traffic volume measurement (TVM) or buffer size to RNC 130 using the slow PRACH (step 3). Node B 120 and RNC 130 may exchange signaling messages to set up a radio link, set up Iub bearer, and synchronize the Iub bearer for the downlink and uplink for UE 110 (steps 4 to 7). RNC 130 may then send a Physical Channel Reconfiguration message to UE 110 to convey uplink resources allocated to UE 110 (step 8). UE 110 may transition from the CELL_FACH state to the CELL_DCH state upon receiving the Physical Channel Reconfiguration message and may return a Physical Channel Reconfiguration Complete message to RNC 130 (step 9).

UE 110 may then send the short message on the allocated uplink resources (step 10). UE 110 may thereafter exchange signaling messages with RNC 130 to release the allocated resources and then transition from the CELL_DCH state back to the CELL_FACH state (step 11).

As shown in FIG. 7, UE 110, Node B 120, and RNC 130 may exchange various signaling messages in order to allocate uplink resources to UE 110 to send the short message. This may increase signaling overhead and delay transmission of the short message.

Figure 8:
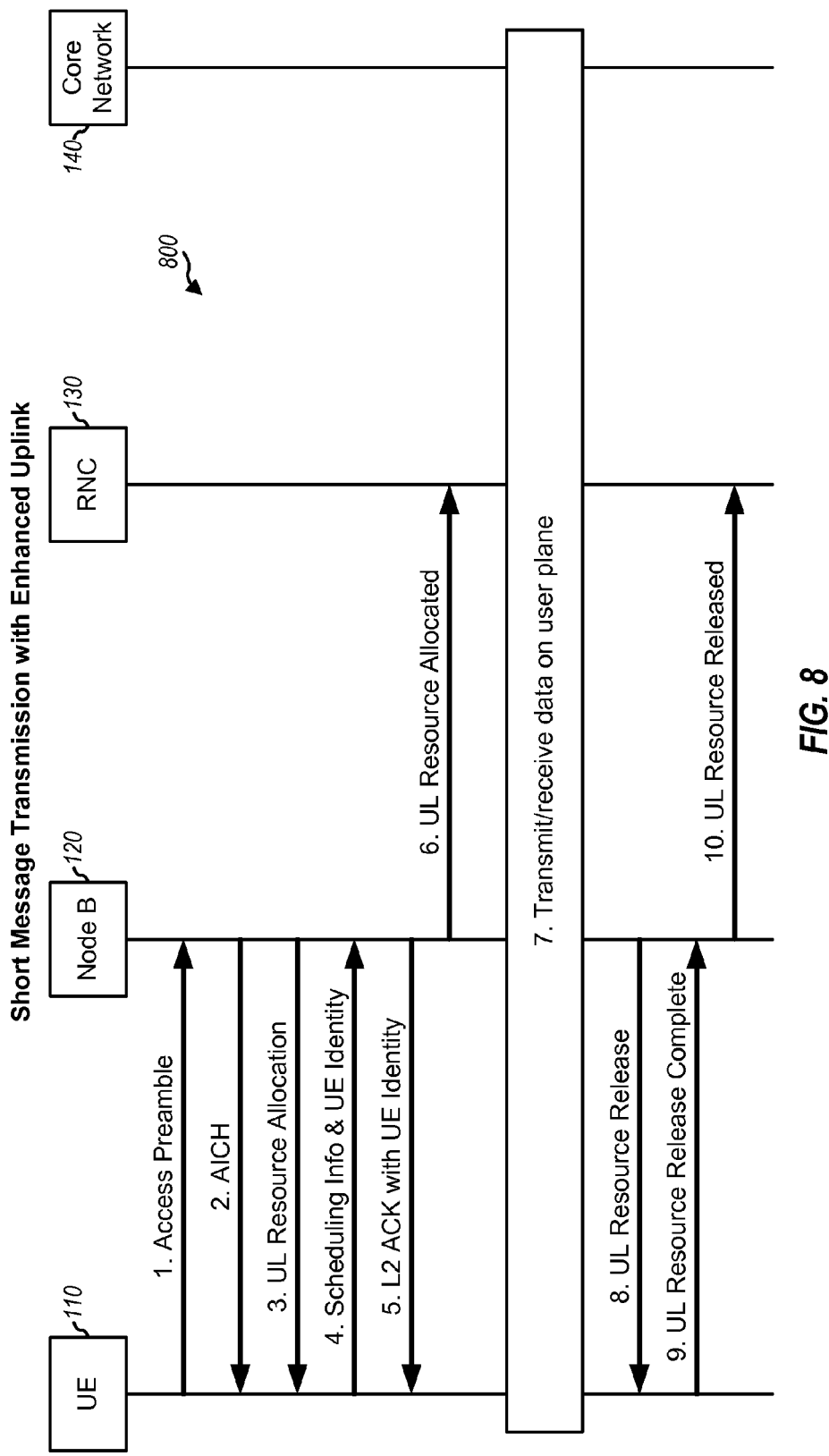
FIG. 8 shows a call flow for short message transmission using the enhanced uplink.

FIG. 8 shows a design of a call flow 800 for short message transmission using the enhanced uplink in the CELL_FACH state. UE 110 may operate in the CELL_FACH state and may desire to send a short message. UE 110 may send an access preamble on the uplink (step 1) and may receive an acquisition indicator on the AICH (step 2) as well as an uplink resource allocation message from Node B 120 (step 3). UE 110 may send scheduling information and its UE identity to Node B 120 using the allocated resources (step 4) and may receive an L2 acknowledgement message from Node B 120 (step 5). Node B 120 may notify RNC 130 that uplink resources have been allocated to UE 110 (step 6). UE 110 may thereafter send the short message on the high-speed E-DPDCH to Node B 120 (step 7). At some point, Node B 120 may send an Uplink Resource Release message to UE 110 (step 8), which may release the allocated resources and return an Uplink Resource Release Complete message (step 9). Node B 120 may also inform RNC 130 of the released resources (step 10).

In the design shown in FIG. 8, UE 110 can send the short message earlier after completing the message exchanges with Node B 120. UE 110 can also release resources quickly via message exchanges Node B 120. UE 110 can avoid exchanging signaling messages with RNC 130, which may reduce setup delay as well as signaling overhead.

FIG. 9 shows a design of a process 900 performed by a UE for operation with enhanced uplink in inactive state. The UE may send an access preamble for random access (block 912). The UE may receive from a Node B a message comprising resources allocated to the UE (block 914). The allocated resources may be selected by the Node B from a pool of resources pre-allocated to the Node B and available for allocation by the Node B to UEs for enhanced uplink. The allocated resources may be for a high-speed channel (e.g., the E-DPDCH) supporting higher rate than a random access channel. The UE may send information (e.g., scheduling information, a UE identity, and one or more short messages, etc.) to the Node B using the allocated resources (block 916).

The UE may operate in an inactive state (e.g., the CELL_FACH state) prior to sending the access preamble and also while sending the information using the allocated resources (block 918). The UE may remain in the inactive state and continue to use the allocated resources. The UE may release the allocated resources in response to (i) receiving a scheduling grant for no resources from the Node B, (ii) sending scheduling information indicating no more data to send by the UE, or (iii) occurrence of some other event. Alternatively, the UE may transition from the inactive state to an active state (e.g., the CELL_DCH state) (block 920). In one design, the UE may receive from an RNC an allocation of new resources for use by the UE in the active state (block 922). In another design, the UE may continue to use the allocated resources after transitioning to the active state.

FIG. 10 shows a design of a process 1000 performed by a Node B to support UE operation with enhanced uplink in inactive state. The Node B may receive an access preamble from a UE for random access (block 1012). The Node B may allocate resources to the UE from a pool of resources pre-allocated to the Node B and available for allocation by the Node B to UEs for enhanced uplink (block 1014). The Node B may send a message comprising the allocated resources to the UE (block 1016). The Node B may receive information (e.g., scheduling information, a UE identity, one or more short messages, etc.) sent by the UE using the allocated resources (block 1018). The Node B may pre-configure bearers for the pool of pre-allocated resources with an RNC. The Node B may exchange data for the UE with the RNC using a bearer associated with the resources allocated to the UE. The Node B may de-allocate the resources allocated to the UE in response to (i) detecting inactivity with the allocated resources, (ii) receiving scheduling information indicating no more data to send by the UE, or (iii) occurrence of some other event.

Figures 11, 12:
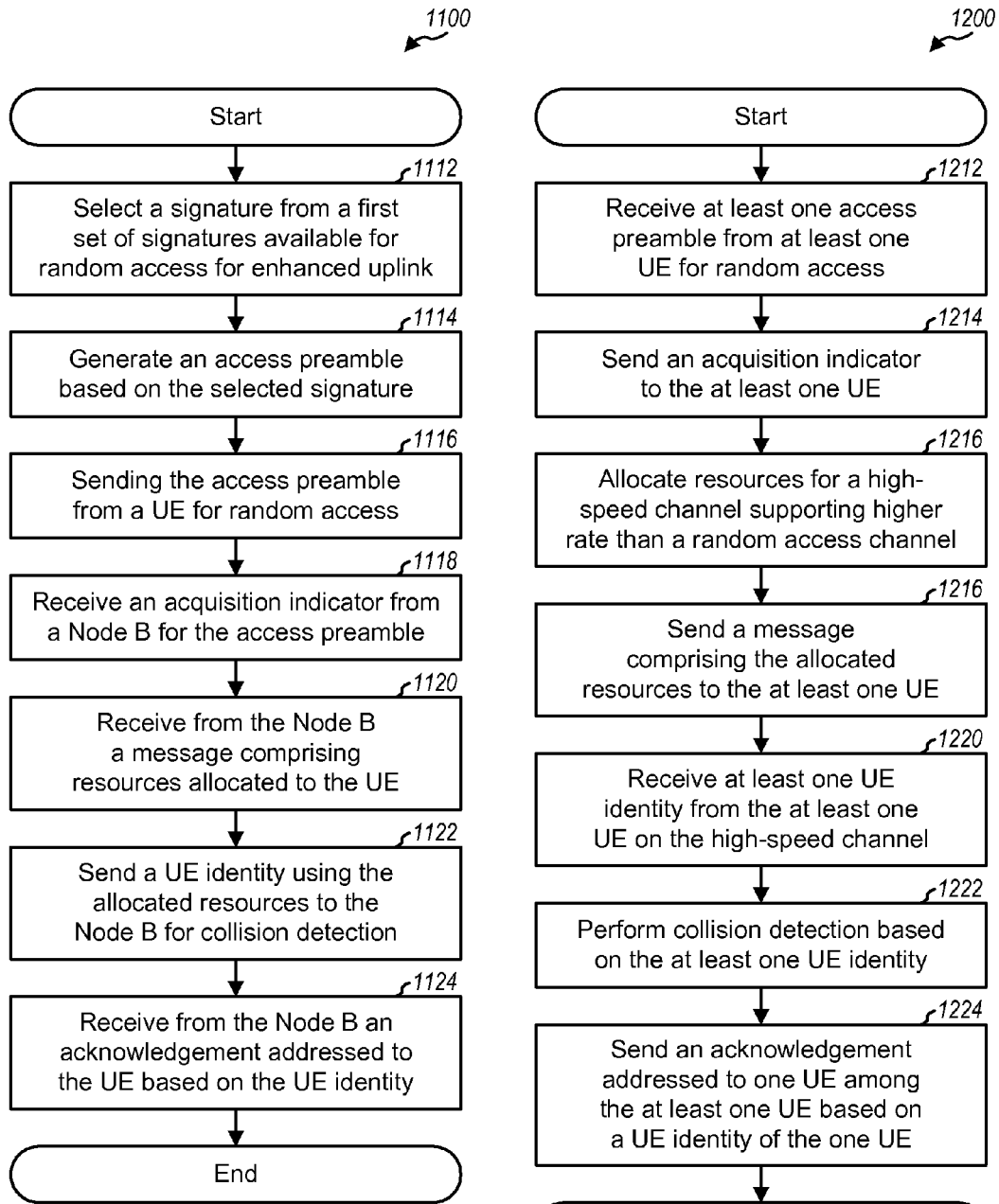
FIG. 11 shows a process performed by the UE for random access.
FIG. 12 shows a process performed by the Node B to support random access.

FIG. 11 shows a design of a process 1100 performed by a UE for random access for enhanced uplink. The UE may select a signature from a first set of signatures available for random access for enhanced uplink (block 1112). The first set of signatures may be different from a second set of signatures available for random access with a random access channel. The UE may generate an access preamble based on the selected signature (block 1114) and may send the access preamble for random access (block 1116). The UE may receive an acquisition indicator from a Node B for the access preamble (block 1118). The UE may also receive from the Node B a message comprising resources allocated to the UE (block 1120). The allocated resources may be for a high-speed channel supporting higher rate than the random access channel. The UE may send a UE identity (e.g., an E-RNTI, an IMSI, a TMSI, etc.) to the Node B for collision detection, e.g., on the high-speed channel instead of the random access channel (block 1122). The UE may receive from the Node B an acknowledgement addressed to the UE based on the UE identity (block 1124). The UE may set a timer upon sending the UE identity and may send another access preamble if an acknowledgement is not received prior to expiration of the timer.

FIG. 12 shows a design of a process 1200 performed by a Node B to support random access for enhanced uplink. The Node B may receive at least one access preamble from at least one UE for random access (block 1212). The Node B may send an acquisition indicator to the at least one UE (block 1214). The Node B may allocate resources for a high-speed channel supporting higher rate than a random access channel (block 1216). The Node B may send a message comprising the allocated resources to the at least one UE (block 1218).

The Node B may receive at least one UE identity from the at least one UE, e.g., on the high-speed channel instead of the random access channel (block 1220). Each UE identity may comprise an E-RNTI, an IMSI, a TMSI, etc. The Node B may perform collision detection based on the at least one UE identity (block 1222). The Node B may send an acknowledgement addressed to one UE among the at least one UE based on a UE identity of the one UE (block 1224). The Node B may detect collision if multiple UE identities are received from multiple UEs in response to the acquisition indicator and may then select one of the multiple UEs for sending the acknowledgement.

In one design, the Node B may determine at least one signature used for the at least one access preamble received from the at least one UE. The Node B may use the random access channel for each UE sending an access preamble generated with a signature in a first set of signatures. The Node B may use the high-speed channel for each UE sending an access preamble generated with a signature in a second set of signatures.

The enhanced uplink for inactive state (e.g., the CELL_FACH state) may provide various advantages. The enhanced uplink may achieve one or more of the following:

Support higher peak rates using larger transport block sizes available on E-DPDCH, Allow a UE to use the E-DCH shortly after sending an access preamble and avoid a lengthy synchronization period for transitioning from the CELL_FACH state to the CELL_DCH state, Improve latency and reliability of a RACH message due to H-ARQ and fast closed-loop power control features available for the E-DPDCH, and Reduce state transition delay as well as latency of data in user plane and signaling in control plane.

Figure 13:
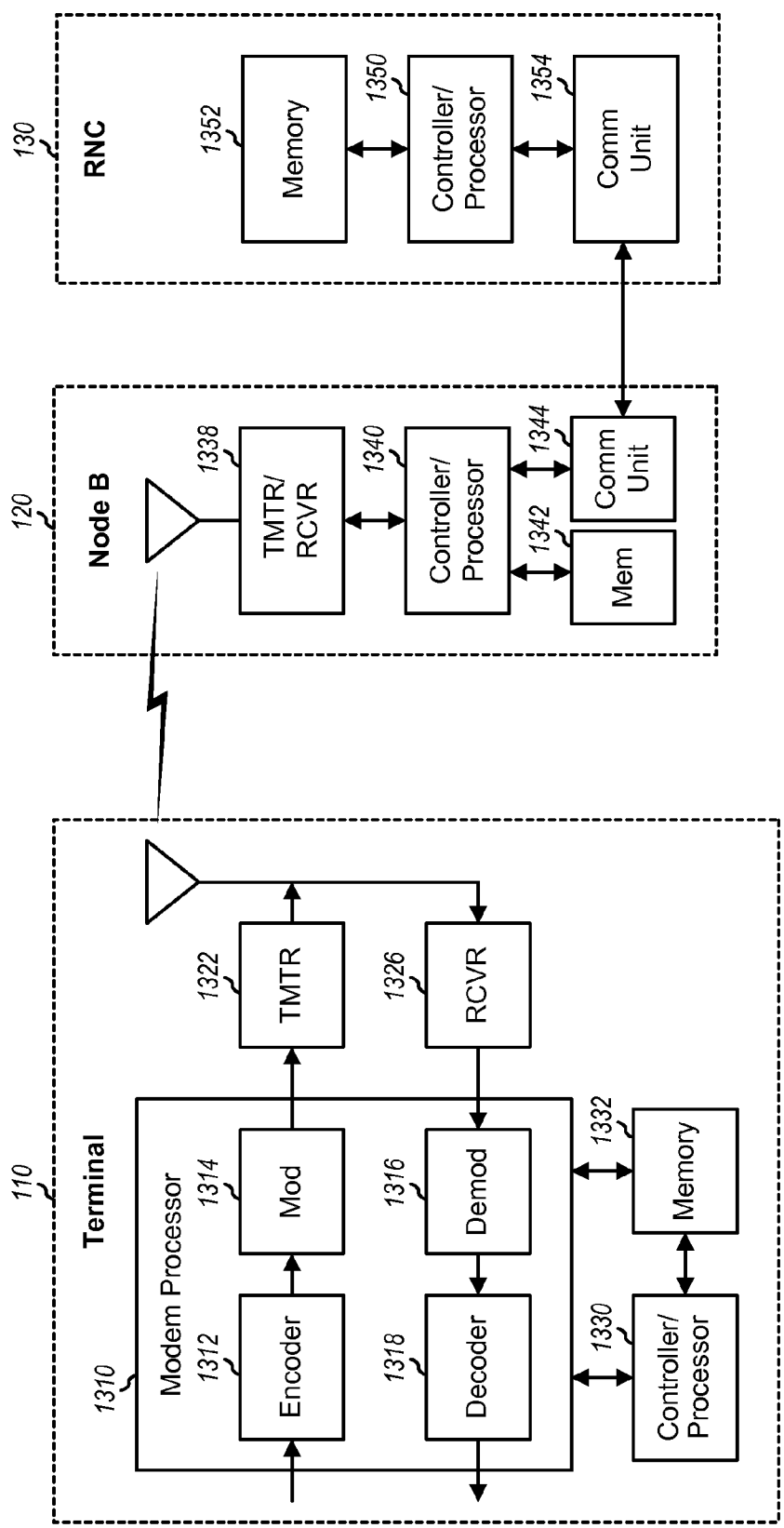
FIG. 13 shows a block diagram of the UE and the Node B.

FIG. 13 shows a block diagram of a design of UE 110, Node B 120, and RNC 130 in FIG. 1. At UE 110, an encoder 1312 may receive information (e.g., scheduling information, UE identity, messages, etc.) to be sent by UE 120. Encoder 1312 may process (e.g., format, encode, and interleave) the information to obtain coded data. A modulator (Mod) 1314 may further process (e.g., modulate, channelize, and scramble) the coded data and provide output samples. A transmitter (TMTR) 1322 may condition (e.g., convert to analog, filter, amplify, and frequency upconvert) the output samples and generate an uplink signal, which may be transmitted to one or more Node Bs. UE 110 may also receive downlink signals transmitted by one or more Node Bs. A receiver (RCVR) 1326 may condition (e.g., filter, amplify, frequency downconvert, and digitize) a received signal and provide input samples. A demodulator (Demod) 1316 may process (e.g., descramble, channelize, and demodulate) the input samples and provide symbol estimates. A decoder 1318 may process (e.g., deinterleave and decode) the symbol estimates and provide information (e.g., resource allocation, messages, etc.) sent to UE 110. Encoder 1312, modulator 1314, demodulator 1316, and decoder 1318 may be implemented by a modem processor 1310. These units may perform processing in accordance with the radio technology (e.g., WCDMA) used by the system. A controller/processor 1330 may direct the operation of various units at UE 110. Controller/processor 1330 may perform or direct process 900 in FIG. 9, process 1100 in FIG. 11, and/or other processes for the techniques described herein. Controller/processor 1330 may also perform or direct the tasks performed by UE 110 in FIGS. 4 through 8. Memory 1332 may store program codes and data for UE 110.

At Node B 120, a transmitter/receiver 1338 may support radio communication with UE 110 and other UEs. A controller/processor 1340 may perform various functions for communication with the UEs. For the uplink, the uplink signal from UE 110 may be received and conditioned by receiver 1338 and further processed by controller/processor 1340 to recover information sent by UE 110. For the downlink, information may be processed by controller/processor 1340 and conditioned by transmitter 1338 to generate a downlink signal, which may be transmitted to UE 110 and other UEs. Controller/processor 1340 may perform or direct process 1000 in FIG. 10, process 1200 in FIG. 12, and/or other processes for the techniques described herein. Controller/processor 1340 may also perform or direct the tasks performed by Node B 120 in FIGS. 4 through 8. Memory 1342 may store program codes and data for Node B 120. A communication (Comm) unit 1344 may support communication with RNC 130 and other network entities.

At RNC 130, a controller/processor 1350 may perform various functions to support communication services for the UEs. Controller/processor 1350 may also perform or direct the tasks performed by RNC 130 in FIGS. 4 through 8. Memory 1352 may store program codes and data for RNC 130. A communication unit 1354 may support communication with Node B 120 and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
selecting a signature from a first set of signatures available for random access for an enhanced uplink, the first set of signatures being different from a second set of signatures available for random access with a random access channel, and the first set of signatures and the second set of signatures indicating temporary identities of a plurality of user equipment (UE);
generating, at one of the plurality of UEs, an access preamble based on the selected signature;
sending the access preamble from the UE for random access;
receiving from a Node B a message corresponding to the access preamble, the message comprising resources allocated to the UE, the allocated resources including enhanced dedicated channel (E-DCH) resources and being selected by the Node B from a pool of resources pre-allocated to the Node B and available for allocation by the Node B to UEs;
sending information to the Node B using the allocated resources;
operating in a CELL_FACH state prior to sending the access preamble and also while sending the information using the allocated resources;
transitioning from the CELL_FACH state to a CELL_DCH state; and
continuing to use the allocated resources after transitioning to the CELL_DCH state or receiving an allocation of new resources for use in the CELL_DCH state.

2. The method of claim 1, wherein the sending information comprises
sending at least one of scheduling information, a UE identity, and a message to the Node B using the allocated resources.

3. The method of claim 1, further comprising:
operating in an inactive state prior to sending the access preamble and also while sending the information using the allocated resources.

4. The method of claim 3, further comprising:
transitioning from the inactive state to an active state; and
receiving from a Radio Network Controller (RNC) an allocation of resources for use in the active state.

5. The method of claim 1, further comprising:
releasing the allocated resources in response to receiving a scheduling grant for no resources from the Node B or in response to sending scheduling information indicating no more data to send by the UE.

6. The method of claim 1, wherein the allocated resources are for a high-speed channel supporting higher rate than a random access channel.

7. The method of claim 1, wherein the resources are time-frequency resources.

8. An apparatus for wireless communication, comprising:
at least one processor configured to:
select a signature from a first set of signatures available for random access for an enhanced uplink, the first set of signatures being different from a second set of signatures available for random access with a random access channel, and the first set of signatures and the second set of signatures indicating temporary identities of a plurality of user equipment (UE);
generate, at one of the plurality of UEs, an access preamble based on the selected signature;
send the access preamble from the UE for random access;
receive from a Node B a message corresponding to the access preamble, the message comprising resources allocated to the UE, the allocated resources including enhanced dedicated channel (E-DCH) resources and being selected by the Node B from a pool of resources pre-allocated to the Node B and available for allocation by the Node B to UEs;
send information to the Node B using the allocated resources;
operate in a CELL_FACH state prior to sending the access preamble and also while sending the information using the allocated resources;
transition from the CELL_FACH state to a CELL_DCH state; and
continue to use the allocated resources after transitioning to the CELL_DCH state or receiving an allocation of new resources for use in the CELL_DCH state.

9. The apparatus of claim 8, wherein the at least one processor is configured to send at least one of scheduling information, a UE identity, and a message to the Node B using the allocated resources.

10. The apparatus of claim 8, wherein the at least one processor is configured to operate in an inactive state prior to sending the access preamble and also while sending the information using the allocated resources.

11. The apparatus of claim 10, wherein the at least one processor is configured to transition from the inactive state to an active state, and to receive from a Radio Network Controller (RNC) an allocation of resources for use in the active state.

12. The apparatus of claim 8, wherein the resources are time-frequency resources.

13. An apparatus for wireless communication, comprising:
means for selecting a signature from a first set of signatures available for random access for an enhanced uplink, the first set of signatures being different from a second set of signatures available for random access with a random access channel, and the first set of signatures and the second set of signatures indicating temporary identities of a plurality of user equipment (UE);

means for generating, at one of the plurality of UEs, an access preamble based on the selected signature;

means for sending the access preamble from the UE for random access;

means for receiving from a Node B a message corresponding to the access preamble, the message comprising resources allocated to the UE, the allocated resources including enhanced dedicated channel (E-DCH) resources and being selected by the Node B from a pool of resources pre-allocated to the Node B and available for allocation by the Node B to UEs;

means for sending information to the Node B using the allocated resources;

means for operating in a CELL_FACH state prior to sending the access preamble and also while sending the information using the allocated resources;

means for transitioning from the CELL_FACH state to a CELL_DCH state; and means for continuing to use the allocated resources after transitioning to the CELL_DCH state or receiving an allocation of new resources for use in the CELL_DCH state.

14. A computer program product, comprising:
a non-transitory computer-readable medium comprising:
code for causing at least one computer to select a signature from a first set of signatures available for random access for an enhanced uplink, the first set of signatures being different from a second set of signatures available for random access with a random access channel, and the first set of signatures and the second set of signatures indicating temporary identities of a plurality of user equipment (UE);
code for causing at least one computer to generate, at one of the plurality of UEs, an access preamble based on the selected signature;
code for causing at least one computer to send the access preamble from the UE for random access,
code for causing the at least one computer to receive from a Node B a message corresponding to the access preamble, the message comprising resources allocated to the UE, the allocated resources including enhanced dedicated channel (E-DCH) resources and being selected by the Node B from a pool of resources pre-allocated to the Node B and available for allocation by the Node B to UEs,
code for causing the at least one computer to send information to the Node B using the allocated resources
code for operating in a CELL_FACH state prior to sending the access preamble and also while sending the information using the allocated resources,
code for transitioning from the CELL_FACH state to a CELL_DCH state, and
code for continuing to use the allocated resources after transitioning to the CELL_DCH state or receiving an allocation of new resources for use in the CELL_DCH state.

15. A method for wireless communication, comprising:
receiving an access preamble from a user equipment (UE) for random access, wherein the access preamble was generated at the UE based on a signature selected from a first set of signatures available for random access for an enhanced uplink, the first set of signatures being different from a second set of signatures available for random access with a random access channel, and the first set of signatures and the second set of signatures indicating temporary identities of a plurality of UEs that include the UE;

allocating, in response to the access preamble, resources to the UE from a pool of resources pre-allocated to a Node B and available for allocation by the Node B to the plurality of UEs, wherein the allocated resources include enhanced dedicated channel (E-DCH) resources;

sending a message comprising the allocated resources to the UE; and receiving information sent by the UE with the allocated resources,
wherein the UE operates in a CELL_FACH state prior to sending the access preamble and also while sending the information using the allocated resources,
wherein the UE transitions from the CELL FACH state to a CELL_DCH state, and
wherein the UE continues to use the allocated resources after transitioning to the CELL_DCH state or receiving an allocation of new resources for use in the CELL_DCH state.

16. The method of claim 15, wherein the receiving information comprises
receiving at least one of scheduling information, a UE identity, and a message from the UE.

17. The method of claim 15, further comprising:
pre-configuring bearers for the pool of pre-allocated resources with a Radio Network Controller (RNC); and
exchanging data for the UE with the RNC using a bearer associated with the resources allocated to the UE.

18. The method of claim 15, further comprising:
de-allocating the allocated resources in response to detecting inactivity with the allocated resources or in response to receiving an indication of no more data to send by the UE.

19. The method of claim 15, wherein the resources are time-frequency resources.

20. The method of claim 15, further comprising:
detecting the receiving of the information sent by the UE with the allocated resources as extending beyond a given time-out; and
in response to detecting the information sent by the UE with the allocated resources as extending beyond the given time-out, sending to a Radio Network Controller (RNC) a notice indicating the detecting.

21. The method of claim 20, wherein the resources are time-frequency resources.

22. The method of claim 20, further comprising receiving from the RNC additional resources to add to the pool of resources pre-allocated to the Node B and available for allocation by the Node B to UEs.

23. An apparatus for wireless communication, comprising:
at least one processor configured to:
receive an access preamble from a user equipment (UE) for random access, wherein the access preamble was generated at the UE based on a signature selected from a first set of signatures available for random access for an enhanced uplink, the first set of signatures being different from a second set of signatures available for random access with a random access channel, and the first set of signatures and the second set of signatures indicating temporary identities of a plurality of UE that include the UE;
allocate, in response to the access preamble, resources to the UE from a pool of resources pre-allocated to a Node B and available for allocation by the Node B to the plurality of UEs, wherein the allocated resources include enhanced dedicated channel (E-DCH) resources;

send a message comprising the allocated resources to the UE; and receive information sent by the UE with the allocated resources, wherein the UE operates in a CELL_FACH state prior to sending the access preamble and also while sending the information using the allocated resources, wherein the UE transitions from the CELL FACH state to a CELL_DCH state, and wherein the UE continues to use the allocated resources after transitioning to the CELL_DCH state or receiving an allocation of new resources for use in the CELL_DCH state.

24. The apparatus of claim 23, wherein the at least one processor is configured to receive at least one of scheduling information, a UE identity, and a message from the UE.

25. The apparatus of claim 23, wherein the at least one processor is configured to pre-configure bearers for the pool of pre-allocated resources with a Radio Network Controller (RNC), and to exchange data for the UE with the RNC using a bearer associated with the resources allocated to the UE.

26. The apparatus of claim 23, wherein the at least one processor is configured to de-allocate the allocated resources in response to detecting inactivity with the allocated resources or in response to receiving an indication of no more data to send by the UE.

27. The apparatus of claim 23, wherein the resources are time-frequency resources.

28. The apparatus of claim 23, wherein the at least one processor is further configured to detect the receiving of the information sent by the UE with the allocated resources as extending beyond a given time-out; and, in response to the detecting, to send from the Node B to a Radio Network Controller (RNC) a notice indicating the detecting.

29. The apparatus of claim 28, wherein the resources are time-frequency resources.

30. The apparatus of claim 28, wherein the at least one processors is further configured to receive from the RNC additional resources to add to the pool of resources pre-allocated to the Node B and available for allocation by the Node B to UEs.

* * * * *